United States Patent [19]

Fulgenzi et al.

[11] Patent Number: 5,542,742
[45] Date of Patent: *Aug. 6, 1996

[54] INTEGRATED INFANT SEAT FOR VEHICLES

[75] Inventors: Lynda K. Fulgenzi, Dearborn Heights; Roger P. Daniel, Dearborn; Heather M. Loftus, Clawson; Jeffrey L. Goins, New Haven, all of Mich.

[73] Assignee: Ford Motor Company, Dearborn, Mich.

[ * ] Notice: The term of this patent shall not extend beyond the expiration date of Pat. No. 5,524,962.

[21] Appl. No.: 216,707

[22] Filed: Mar. 23, 1994

[51] Int. Cl.⁶ .................................................. A47C 15/00
[52] U.S. Cl. .......................... 297/237; 297/236; 297/238
[58] Field of Search ............................ 297/235, 236, 297/237, 238, 284.9

[56] References Cited

U.S. PATENT DOCUMENTS

| | | | |
|---|---|---|---|
| 4,500,135 | 2/1985 | Kincheloe . | |
| 4,500,136 | 2/1985 | Murphy et al. | 297/284.9 |
| 4,533,176 | 8/1985 | Wyttenbach | 297/238 |
| 4,596,420 | 6/1986 | Vaidya | 297/238 X |
| 4,607,885 | 8/1986 | del Fierro . | |
| 4,636,000 | 1/1987 | Nishino | 297/284.9 |
| 4,664,443 | 5/1987 | Casale | 297/238 |
| 4,756,573 | 7/1988 | Simin et al. | 297/238 X |
| 4,767,155 | 8/1988 | Kausaka et al. | 297/284.9 |
| 4,768,827 | 9/1988 | Musgrave | 297/236 |
| 4,936,627 | 6/1990 | Guim | 297/238 |
| 4,986,603 | 1/1991 | Hanai et al. | 297/238 X |
| 5,035,465 | 5/1991 | Hanai et al. | 297/238 |
| 5,083,837 | 1/1992 | Roach . | |
| 5,106,158 | 4/1992 | Dakatz et al. | 297/238 X |
| 5,121,964 | 6/1992 | Fourrey et al. . | |
| 5,370,444 | 12/1994 | Stulik | 297/284.9 X |
| 5,555,135 | 11/1985 | Freeland . | |

FOREIGN PATENT DOCUMENTS

| | | | |
|---|---|---|---|
| 0516495 | 5/1991 | European Pat. Off. . | |
| 2823529 | 6/1979 | Germany . | |
| 3800896 | 9/1988 | Germany | 297/237 |
| 59-156837 | 6/1984 | Japan . | |

*Primary Examiner*—Peter M. Cuomo
*Assistant Examiner*—Rodney B. White
*Attorney, Agent, or Firm*—Gregory P. Brown; Roger L. May

[57] ABSTRACT

An infant seat apparatus is described for a primary seat in a motor vehicle. The infant seating apparatus includes an infant seat cushion, an infant seat back and an overhead guide attached to an upper end of the infant seat back substantially perpendicular to the infant seat back. The guide projects toward a primary seat back of the primary seat, over the infant seat. The overhead guide directs the inflation of an airbag into the passenger compartment over the infant seat.

16 Claims, 2 Drawing Sheets

5,542,742

INTEGRATED INFANT SEAT FOR VEHICLES

BACKGROUND OF THE INVENTION

1. Field of the Invention

The present invention relates to infant seats for motor vehicles. More particularly, the present invention relates to an infant seat having an overhead guide member for directing the inflation of an airbag.

2. Disclosure Information

Specialized infant seating systems for restraining infants in motor vehicles are well known. These devices generally take the form of cradle-like structural housings which may be secured on top of a sitting surface of a conventional primary seat. The present invention improves these well known infant seating systems by providing an overhead guide member for directing the inflation of an airbag. The present invention further provides an infant seat integrated within a primary seat thereby increasing the convenience and ease of use associated with infant seats when provided with an overhead guide.

U.S. Pat. No. 4,555,135 issued to Freeland and European Patent No. 516495 issued to Rena, represent improvements to infant seating systems by providing an infant seat which may be stored within the sitting surface of a primary seat. Freeland teaches the concept of hingedly fixing the infant seat back and primary seat cushion element to the forward edge of the primary seat. Rena shows an alternative design in which the integrated infant seat slides out of the primary seat cushion on an arcuate track. More particularly, Rena's infant seat includes a part of the primary seat cushion that pivots upward to form an infant headrest, and another part that pivots downward to form an infant seat. Neither of these integrated infant seats, nor the well known cradle-like infants seats provide an overhead guide for directing the inflation of an airbag. Such an overhead guide would provide the added benefit of shielding the infant from bright sunshine.

It would be desirable to provide both cradle-like and integrated infant seats with an overhead guide for directing the inflation of an airbag.

SUMMARY OF THE INVENTION

The present invention advances beyond the systems described above by providing an infant seating apparatus for use in a passenger compartment of a motor vehicle including an instrument panel having an airbag disposed therein, and a primary seat including a primary seat back and a primary seat cushion. The infant seating apparatus includes an infant seat cushion disposed on the primary seat cushion and an infant seat back extending substantially upright from the infant seat cushion and terminating at a first end. This presents the infant seat back facing the primary seat back. There is further included a guide extending from the first end of the infant seat back substantially perpendicular thereto, projecting toward the primary seat back projecting over the infant seat cushion. The guide is adapted to direct the inflation of the airbag above the infant seat.

It is an advantage of the present invention to provide an infant seating system capable of directing an inflating airbag above the infant seat.

Other objects, features and advantages of the present invention will become apparent to those skilled in the art from the drawings, detailed description and claims which follow.

DESCRIPTION OF THE PREFERRED EMBODIMENTS

Figure 1:
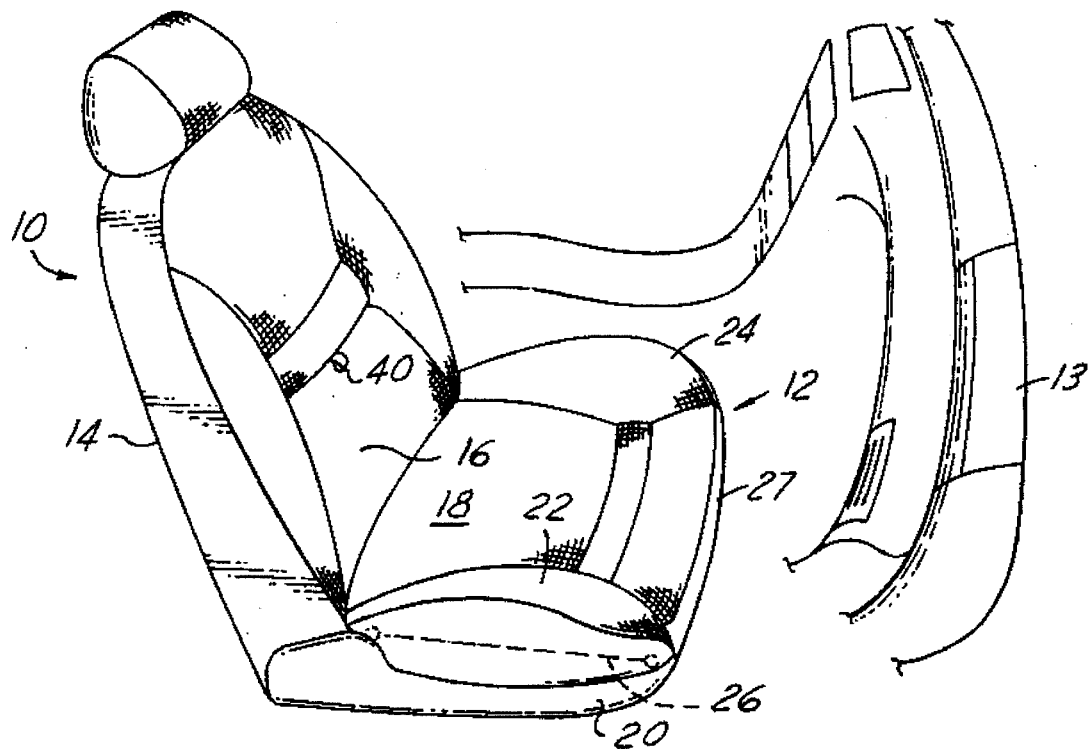
FIG. 1 is a perspective view of primary seat according to the present invention containing an integrated infant seat in a stored position.

Referring now to the Figures, FIG. 1 illustrates a passenger compartment of a motor vehicle having a primary seat 10 including an integrated infant seat 12 stored to permit conventional passenger seating. For the purposes of this description, a primary seat is one that is designed for all passengers not requiring supplemental seating devices, such as infants. A passenger seated in the primary seat 10 faces an instrument panel 13 which includes a supplemental restraint device, such as an airbag.

The primary seat 10 includes a primary seat back 14 having a lumbar support portion 16 disposed in a lower portion of the primary seat back 14. The primary seat 10 further includes a horizontally disposed seat cushion 18 disposed on a seat base 20. In the preferred embodiment, the seat base 20 consists of a frame (not shown) disposed on top of a conventional seat track mechanism (not shown) for fore and aft adjustment of the primary seat within the passenger compartment. The stationary portion of the seat track mechanism is securely fastened to the coachwork of the motor vehicle. Alternatively, the seat base 20 may simply consist of two longitudinal support frames, or a rectangular support frame securely mounted within the passenger compartment of the motor vehicle, as is commonly known to those skilled in the seating art. Elongate bolsters 22, 24 flank the right and left sides of the seat cushion 18 and are attached to seat base 20. The elongate bolsters 22, 24 optionally include a hinge mechanism 26 and a spring (not shown) for urging the elongate bolsters 22, 24 into a predetermined position.

Figure 2:
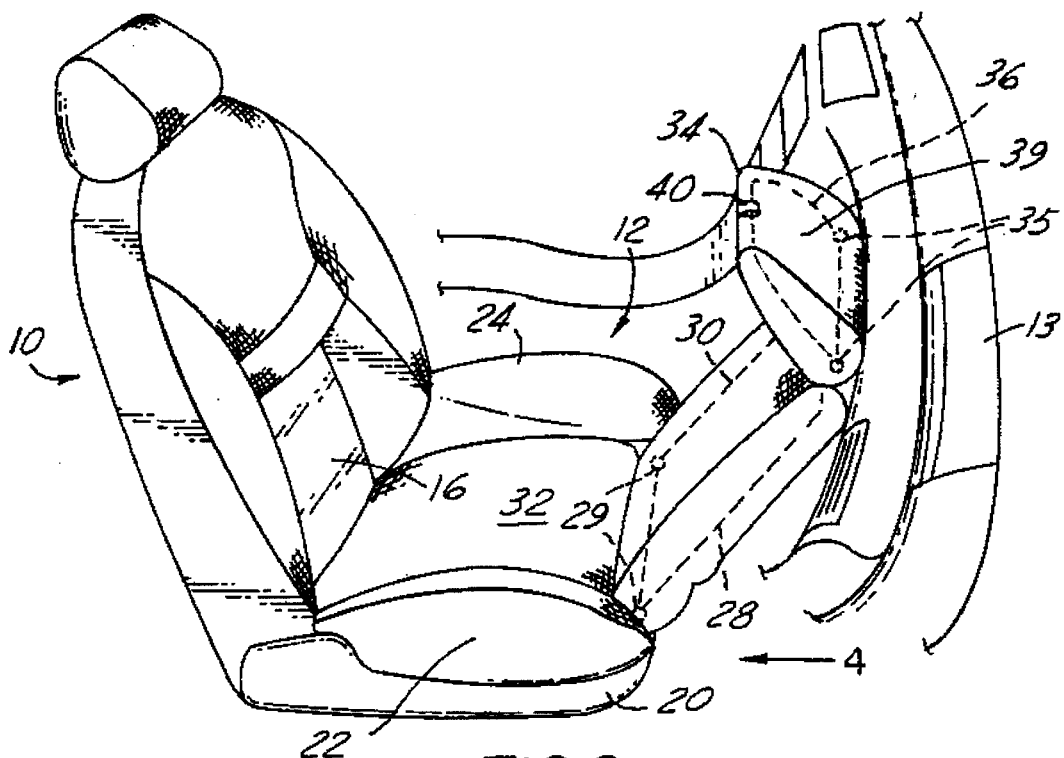
FIG. 2 is a perspective view of a primary seat according to the present invention illustrating an integrated infant seat opened for use.

FIG. 2 illustrates the infant seat 12 in a open position for infant seating. The infant seat 12 includes a planar member 28 having a first end pivotally connected to a first edge 27 of the seat base 20 by a first pivotable fastener 29, well known to those skilled in the reclining seat back arts. The pivotable fastener includes locking means (not shown) to lock the planar member 28 in the upright position, and upon disengagement, allows the planar member 28 to return to the horizontal position. The planar member is a substantially rigid structural member. The planar member includes first and second surfaces, the first being covered with a primary seat cushion 18 and the second being covered by an infant seat back 30. The primary seat cushion 18 and the infant seat back 30 may be glued or otherwise suspended from the planar member 28, either method being commonly known to those skilled in the seating arts.

The infant seat 12 also includes an infant seat cushion 32 securely suspended from the seat base 20. In the stored position, the infant seat back 30 rests against and substantially co-planar with the infant cushion 32. The infant seat cushion may simply comprise a fabric material stretched between the longitudinal support frames. This simple, inexpensive construction suspends the weight of an infant, while providing elasticity necessary to comfortably conform to the infants weight. The present invention is not limited to this form of seat suspension, as alternative seat suspensions are commonly known to those skilled in the seating arts, which would provide equivalent functionality and operability.

FIG. 2 also illustrates an overhead guide 34 pivotally attached to the upper end of the infant seat back 30 by a second pivotable fastener 35. The guide 34 includes a substantially rigid frame 36 constructed from a planar piece of stamped steel. However, the present invention is not so limited, as the guide 34 could be constructed from a wire hoop or a substantially rigid synthetic polymeric material, such as polypropylene and provide the equivalent functionality and operability. One side of the guide 34 has an airbag directing surface 39, which is adapted to be oriented in a predetermined position to provide a low contact angle with an inflating airbag when the infant seat 12 is in the open position. The airbag directing surface 39 of the guide 34 also includes a lumbar cushion 38, such that when the infant seat 12 is in the stored position the guide 34 fits in the lower portion of the primary seat back 14 to provide comfortable lumbar support.

The second pivotable fastener 35 permits the guide to rotate from the stored position to the open position. Engagement means on the fastener (not shown) prevents further rotation of the guide. The engagement means positively stops further rotation of the guide 34 relative to the infant seat back 30. The engagement means may comprise a simple tab that abuts against a fixed flange or another grounded tab, or alternatively, a complex button operated tongue and notch arrangement can be provided to permit adjustment of the contact angle between the guide 34 and the airbag within the instrument panel 13.

Figure 3:
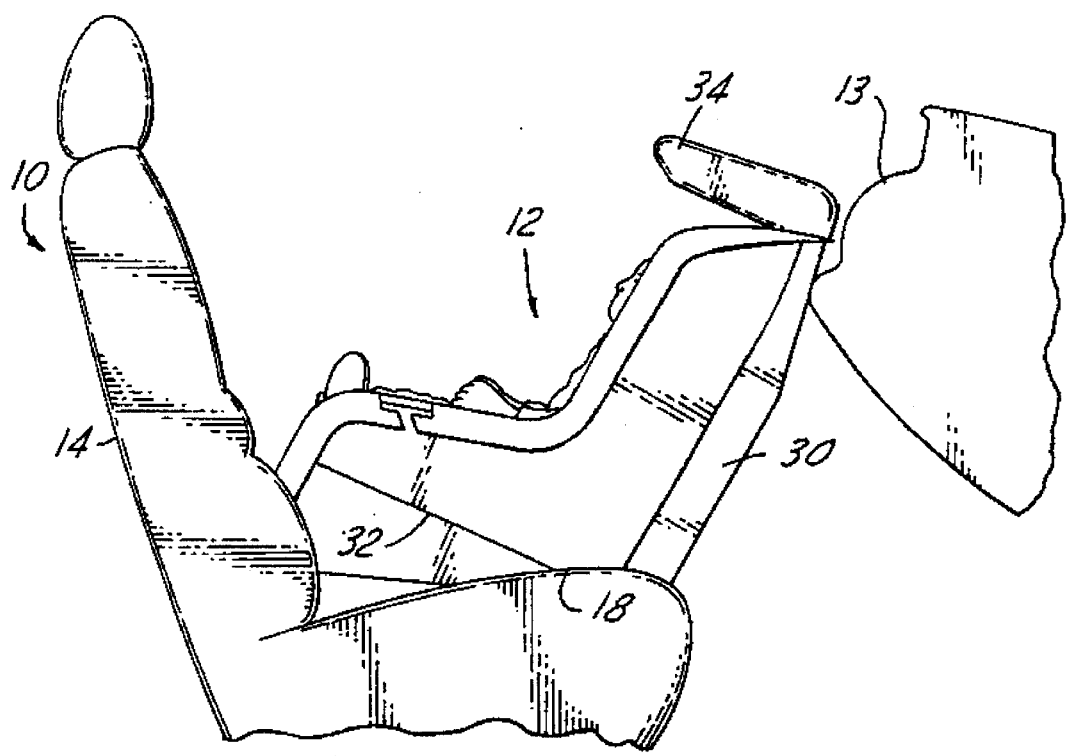
FIG. 3 is a perspective view of a cradle-like infant seat disposed on a primary seat according to the present invention.

FIG. 3 illustrates an alternative embodiment of the present invention, wherein like reference numerals represent like elements throughout the Figures. A conventional cradle-like infant seat 12 is retained on the primary seat 10 in the conventional manner by use of the primary seat restraints (not shown). The infant seat 12 is provided with an overhead guide 34, which, as illustrated, may be integrally molded with the plastic infant seat. However, the present invention is not so limited, as the guide 34 could be separately attached and capable of rotating relative to the infant seat back 30 for improved ingress and egress.

Use of the infant seat 12 is as simple as pulling the guide 34 out of the lumbar portion 18 away from the seat back 14. A tab 40 may be provided to facilitate gripping of the deflector 34 when it is stored in the lumbar support portion 16 of the primary seat back 14. Pulling the planar member 28 upward from the stored position to the deployed position exposes both the infant seat cushion 32 and the infant seat back 30. The planar member 28 rotates toward the instrument panel 13 until it locks into a predetermined position, referred to as the deployed or open position. Simultaneously or sequentially, guide 34 rotates into its predetermined airbag directing position substantially perpendicular to the infant seat back 30. The relationship between the guide 34 and the airbag within the instrument panel 13 dictates the final orientation of the guide 34. The guide 34 projects rearward toward the primary seat back 30, over the infant seat cushion 32. In this position, the guide is best oriented for properly directing the inflation of the airbag and blocking the infant from bright sunlight. Although not shown in the Figures, a three or five point infant seat belt device restrains the infant within the infant seat 12.

The operator returns the infant seat returns to the stored position in the reverse order of the steps above. Simply releasing and rotating the planar member 28 downward toward the seat base 20, and rotating the guide 34 into the lumbar support portion 16 of the primary seat 10 completes storage of the infant seat.

Figure 4:
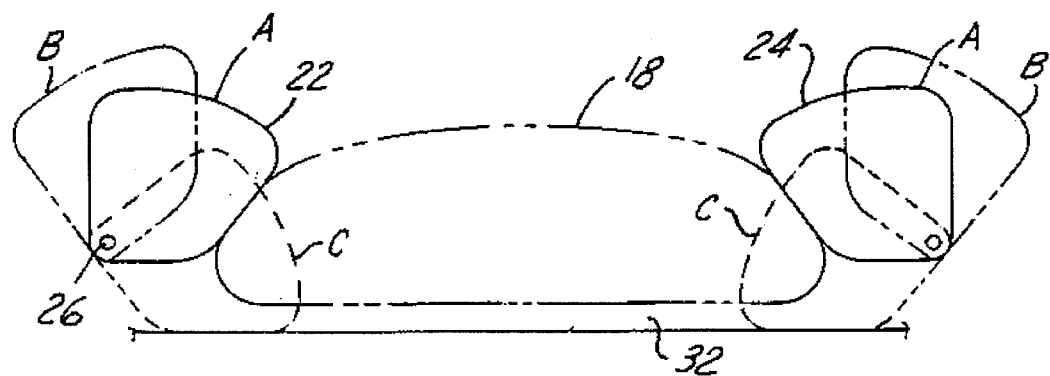
FIG. 4 is a front sectional view taken along line 4—4 of FIG. 2 illustrating the motion of the elongate bolsters according to the present invention.

FIG. 4 illustrates the operation of an embodiment incorporating elongate bolsters 22, 24. The elongate bolsters 22, 24 articulate about the longitudinal axis of the hinge 26. First, with the infant seat 12 in the stored position, shown by A, the bolsters enhance lateral support for the passenger. Second, as the operator pulls the planar member 28 rotates out from the stored position, bolsters 22, 24 rotate outward to the position shown by B. Once the planar member 28 is sufficiently removed from the stored position, the bolsters 22, 24 rotate inward toward the infant seat cushion 32, as shown by C, reducing the space therebetween to improve lateral support for the infant.

Various other modifications and permutations of the present invention, no doubt, will occur to those skilled in the art. For example, the infant seat may be built into the passenger side of the front seat or into either side of the back seat, or any combination thereof. Additionally, the present invention could easily be designed to retrofit existing infant seats by simply providing a device to secure a guide to the structural member of infant seat back. Therefore, it is the following claims, including all equivalents, which define the scope of the present invention.

We claim:

1. An infant seating apparatus for use in a passenger compartment of a motor vehicle including an instrument panel having an airbag disposed therein, and a primary seat including a primary seat back and a primary seat cushion, said infant seating apparatus comprising:

an infant seat cushion disposed under said primary seat cushion;

an infant seat back formed by pivoting said primary seat cushion to an open position, said infant seat back extending substantially upright from said infant seat cushion and terminating at a first end; and a guide formed from a lumbar support section of said primary seat back when in said open position, said guide extending from said first end of said infant seat back substantially perpendicular thereto, projecting toward said primary seat back and over said infant seat cushion, said guide being adapted to direct inflation of said airbag above said infant seating apparatus.

2. An infant seating apparatus according to claim 1, wherein said guide is substantially rigid.

3. An infant seating apparatus according to claim 1, wherein said guide pivotally attaches to said infant seat back to permit adjustment of a contact angle between said guide and said airbag.

4. A passenger seating apparatus for use in a passenger compartment of a motor vehicle including an instrument panel having an airbag disposed therein, said passenger seating apparatus comprising:

a primary seat including a primary seat cushion disposed on a seat base having a first edge;

a primary seat back extending upright from said seat base;

an infant seat cushion disposed on said seat base;

an infant seat back formed by pivoting said primary seat cushion to an open position, said infant seat back extending substantially upright from said infant seat cushion and terminating at a first end; and a guide formed from a lumbar support section of said primary seat back when in said open position, said guide extending from said first end of said infant seat back substantially perpendicular thereto, projecting toward said primary seat back and over said infant seat cushion, said guide being adapted to direct the inflation of said airbag above said infant seating apparatus.

5. A passenger seating apparatus according to claim 4, wherein said guide is substantially rigid.

6. A passenger seating apparatus according to claim 4, wherein said primary seat further comprises first pivot means for allowing said primary seat cushion to rotate upward from said seat base and away from said primary seat back to an open position, said first pivot means interconnecting said primary seat cushion to said seat base.

7. A passenger seating apparatus according to claim 4, wherein said guide pivotally attaches to said infant seat back permitting adjustment of a contact angle between said guide and said airbag.

8. A passenger seating apparatus according to claim 7, wherein said guide includes a lumbar cushion.

9. A passenger seating apparatus according to claim 8, wherein said primary seat further comprises:

a planar member having said primary seat cushion disposed on a first side thereof and said infant seat back disposed on a second side thereof; and first pivot means for allowing said planar member to rotate upward from said seat base and away from said primary seat back to an open position, said first pivot means interconnecting said planar member to said first edge of said seat base.

10. A passenger seating apparatus according to claim 9, wherein said infant seat cushion is attached to said seat base, substantially coplanar with said planar member before said planar mender is rotated to the open position.

11. A passenger seating apparatus according to claim 7, wherein said primary seat further comprises right and left elongate bolsters, each hingedly secured about its longitudinal axis to said seat base, each of said bolsters being adapted to rotate away from said primary seat cushion and inward toward said infant seat cushion, thereby providing variable spacing therebetween.

12. A passenger seating apparatus for use in a passenger compartment of a motor vehicle including an instrument panel having an airbag disposed therein, and having an infant seat integrated within a primary seat of a motor vehicle, said passenger seating apparatus comprising:

a seat base securely disposed within said passenger compartment and having a first edge;

a planar member defining a primary seat cushion on one side thereof when said planar member is in its primary seating position and an infant seat back on to other side thereof, said planar member being pivotally fastened to said first edge of said seat base terminating at a first end of said planar member such that said planar member rotates upward from said seat base to an open position;

a primary seat back mounted to said seat base opposite said first edge, extending upward from said primary seat cushion and having a lumbar portion adjacent to said seat cushion;

an infant seat cushion disposed beneath said planar member when said planar member is in the primary seating position; and a guide extending from said first end of said planar member such that when said planar member is in said open position, said guide is substantially perpendicular thereto, projecting toward said primary seat back, over said infant seat cushion, said guide being adapted to direct inflation of said airbag above said infant seat when in the open position.

13. A passenger seating apparatus according to claim 12, wherein said primary seat further comprises right and left elongate bolsters, each hingedly secured about its longitudinal axis to said seat base, each of said bolsters being adapted to rotate both away from said primary seat cushion and inward toward said infant seat cushion, thereby providing variable spacing therebetween.

14. A passenger seating apparatus according to claim 12, wherein said guide pivotally attaches to said first end of said planar member permitting adjustment of a contact angle between said guide and said airbag.

15. A passenger seating apparatus according to claim 12, wherein said guide includes a lumbar cushion.

16. An infant seating apparatus according to claim 12, wherein said guide is substantially rigid.

\* \* \* \* \*